United States Patent [19]

Hoult et al.

[11] Patent Number: 4,621,899

[45] Date of Patent: Nov. 11, 1986

[54] ASSEMBLY FOR POSITIONING AN OPTICAL ELEMENT

[75] Inventors: Robert A. Hoult, Bethel; Charles F. deMey, West Redding, both of Conn.

[73] Assignee: The Perkin-Elmer Corporation, Norwalk, Conn.

[21] Appl. No.: 598,768

[22] Filed: Apr. 9, 1984

[51] Int. Cl.⁴ .............................................. G02B 00/00
[52] U.S. Cl. ..................................... 350/321; 248/487
[58] Field of Search ............... 350/634, 636, 287, 321; 248/479, 487; 356/346

[56] References Cited

U.S. PATENT DOCUMENTS

| | | | |
|---|---|---|---|
| 3,334,959 | 8/1967 | Walsh | 350/287 |
| 3,402,613 | 9/1968 | Neusel et al. | 350/634 |
| 3,424,413 | 1/1969 | Applegate | 350/634 |
| 3,879,112 | 4/1975 | Hickey | 350/634 |

| | | | |
|---|---|---|---|
| 4,573,794 | 3/1986 | Covey et al. | 248/487 |

FOREIGN PATENT DOCUMENTS 0161810 10/1982 Japan ................................. 350/634

Primary Examiner—John K. Corbin
Assistant Examiner—Vincent J. Lemmo
Attorney, Agent, or Firm—E. T. Grimes; F. L. Masselle

[57] ABSTRACT

An assembly for positioning an optical element, includes a frame member having a base member affixed thereto, which base member carries an optical element rigidly affixed thereon. The base member is mounted to the frame member via a plurality of tilting means which permit the base member to be tilted with respect to the frame member in at least two orthogonal planes and thereby allows the precise alignment of the optical element.

8 Claims, 6 Drawing Figures

ASSEMBLY FOR POSITIONING AN OPTICAL ELEMENT

BACKGROUND OF THE INVENTION

The present invention generally relates to an assembly for positioning an optical element and, in particular, relates to such an assembly which is stable, both mechanically and thermally, precise and easy to adjust.

Present technology can produce, without undue difficulties, extremely flat optical surfaces. As a result, the state of many arts has been clearly advanced. In furtherance of this advancement much emphasis is presently placed on the mounting and alignment of optical elements. Some of the major considerations facing an optical system designer include; the accuracy of angular adjustment; the degree of angular resolution; the thermal and mechanical stability; the range of adjustments and the ease of making an adjustment, to name just a few.

One particular application in which all of these considerations must be accomodated is a Fourier Transform Infrared (FT/IR) spectrophotometer. The optical alignment and stability of an FT/IR is quite critical; for example, because the basis of operation depends on the formation of interferometric patterns. Hence, the elements involved in splitting and recombination of the light beam must be very accurately aligned and must remain aligned or unacceptable inaccuracies, even sample misidentification, will result. Further, every other optical element upon which the recombined beam impinges must be accurately aligned and remain aligned for the same reasons.

SUMMARY OF THE INVENTION

Accordingly, it is one object of the present invention to provide a thermally and mechanically stable assembly for positioning an optical element.

This object is accomplished, at least in part, by an assembly having a frame member, a base member attached thereto and including means therebetween for tilting the base member with respect to the frame member.

Other objects and advantages will become apparent to those skilled in the art from the following detailed description read in conjunction with the appended claims and the attached drawing.

BRIEF DESCRIPTION OF THE DRAWING

The drawing, not drawn to scale, includes.

DETAILED DESCRIPTION OF THE INVENTION

Figure 1:
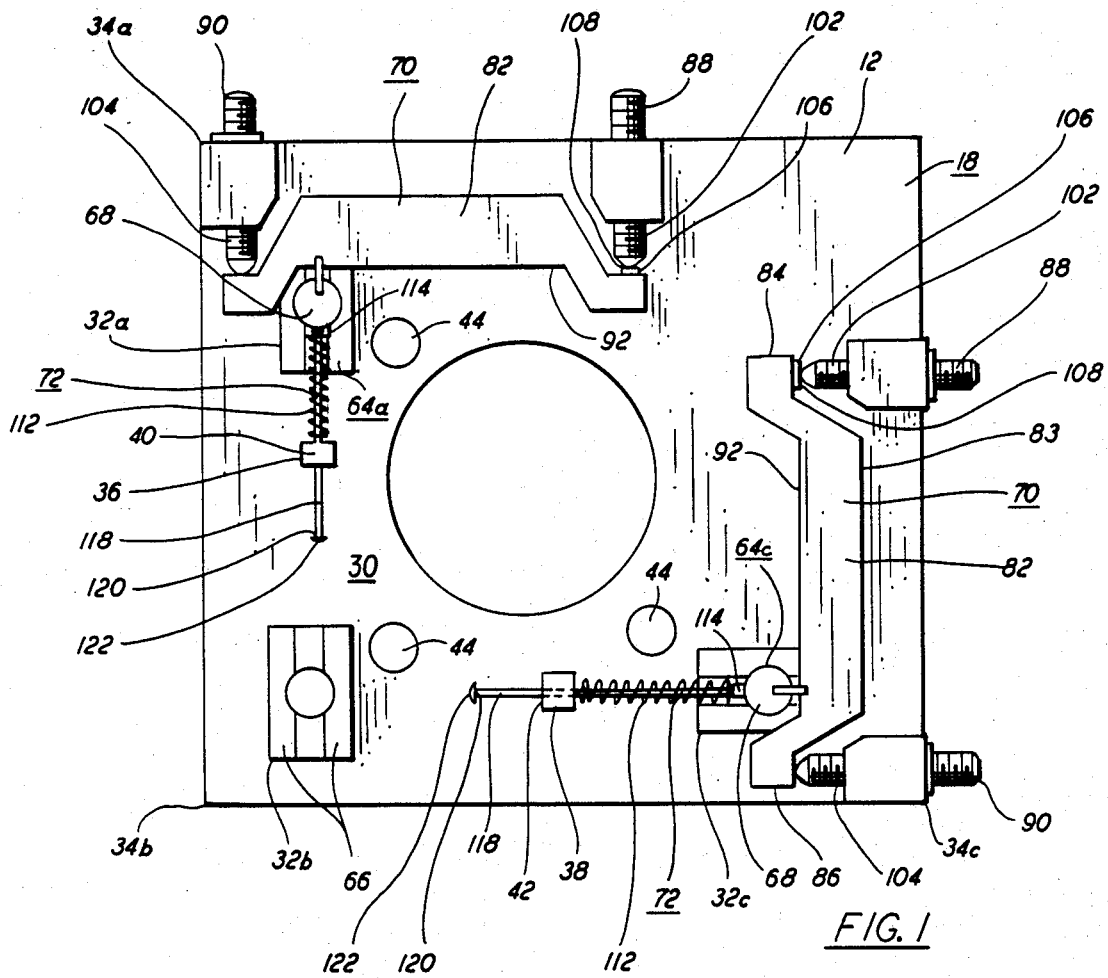
FIG. 1 which is a plan view of a surface of a frame member, including elements associated therewith and embodying the principles of the present invention.

An assembly for positioning an optical element, generally indicated at 10 in the drawing and embodying the principles of the present invention, includes a frame member 12, a base member 14 and means for tilting the base member 14 with respect to the frame member 12.

Figure 4:
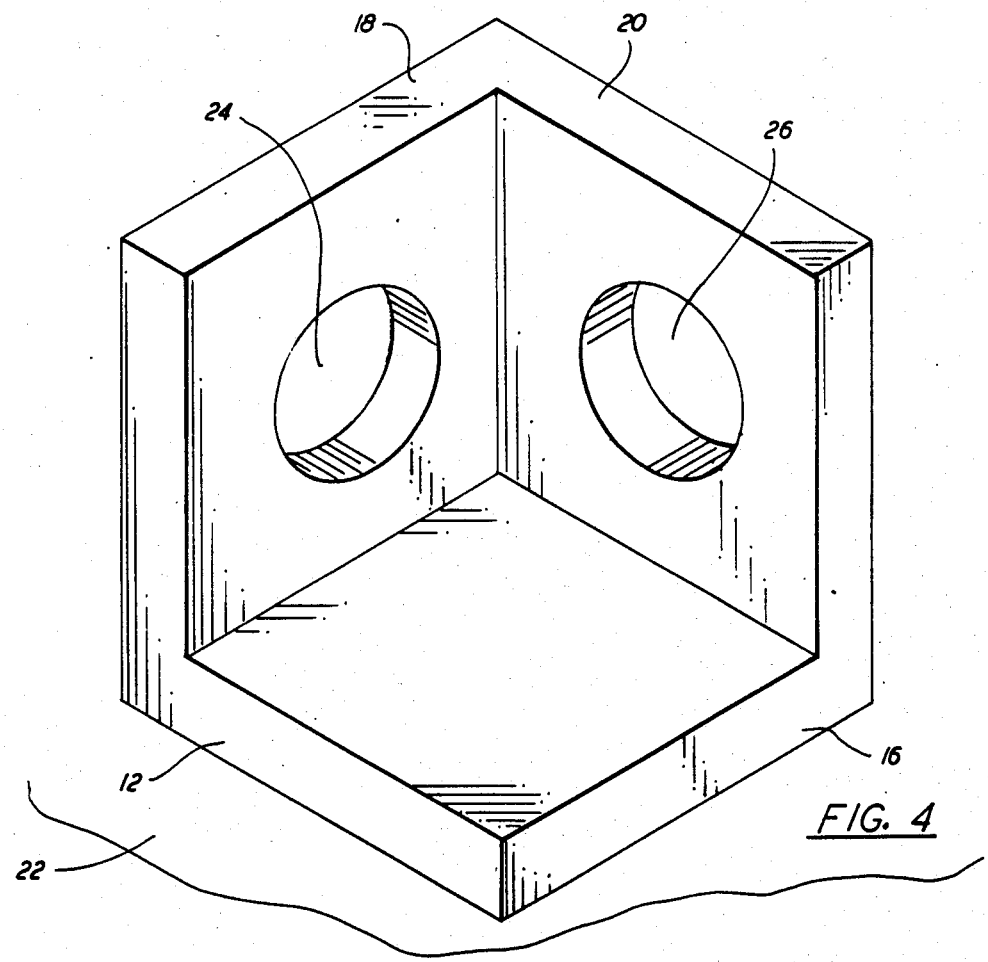
FIG. 4 is a perspective view of a frame member useful in the present assembly.

The frame member 12, an exemplary embodiment of which is shown in FIG. 4, includes three orthogonally connected walls, 16, 18 and 20. In the preferred embodiment, one wall, i.e., 16, is adapted to be rigidly affixed to an optical bench 22. In the present context, the optical bench 22 is deemed to be specifically designed to support a plurality of optical elements in an FT/IR spectrophotometer. The remaining two walls, 18 and 20, include openings, 24 and 26, respectively, therethrough. The openings, 24 and 26, permit the passage therethrough of a light beam, which light beam is aligned to impinge upon an optical element 28 carried by the base member 14. It is with regard to this light beam that the assembly 10 positions the optical element 28.

An exterior surface 30 of one of the upstanding walls, i.e., 18, includes a plurality of indentations 32 extending into the wall 18. In the preferred embodiment, there are three indentations, 32a, 32b and 32c, which are rectangular at the surface 30. Each of the indentations, 32a, 32b and 32c is positioned proximate a corner, 34a, 34b and 34c, respectively, of the surface 30. In the embodiment shown, the indentations, 32a and 32c are spaced furthest apart and oriented so that the centerlines of the longest dimensions thereof intersect at the center of the remaining indentation 32b. Further, although in one embodiment, the bottoms of the furthest spaced indentations, 32a and 32c, slope downwardly in a direction away from the remaining indentation 32b which has a uniform depth, it is preferred that all of the indentations 32 have the same slope.

Preferably, the surface 30 also includes first and second standoffs, 36 and 38, extending therefrom each of which includes an opening, 40 and 42 respectively, therethrough. The standoffs, 36 and 38, for reasons more fully discussed hereinafter, are positioned along the aforementioned centerlines of the furthest spaced indentations 32a and 32c and between each of the furthest spaced indentations, 32a and 32c, and the remaining indentation 32b.

In this embodiment the surface 30 further includes three internally threaded openings 44 spaced about the opening 24 and preferably oriented in a similar fashion as the indentations 32.

The indentations 32, the standoffs, 36 and 38 and the threaded openings 44 can be formed by machining techniques well known in the art.

Figure 2:
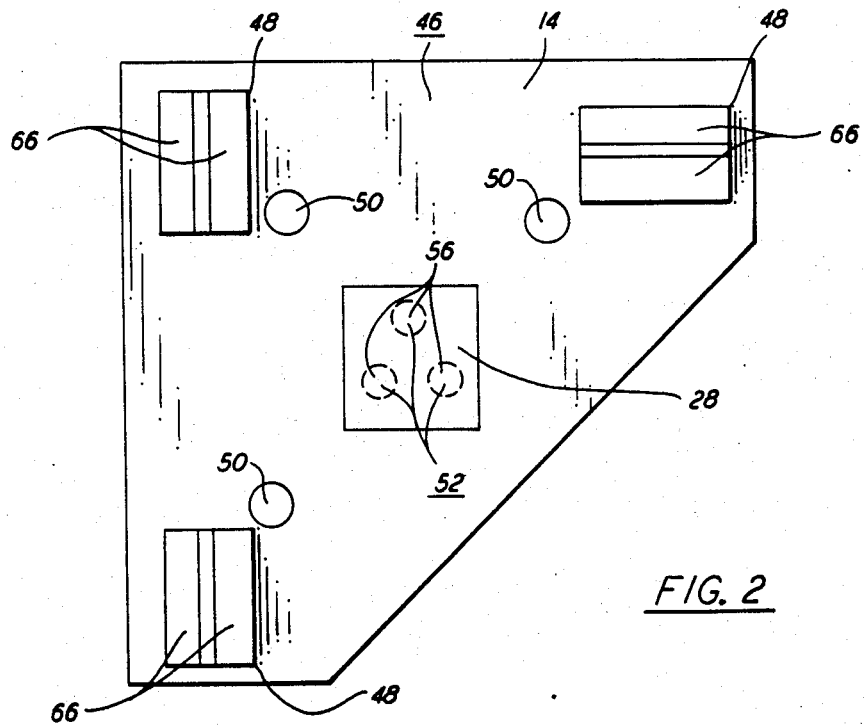
FIG. 2 which is a plan view of one surface of a base member.

Referring specifically to FIG. 2, a first surface 46 of the base member 14 is shown to include a plurality of indentations 48 as well as three clearance throughbores 50. The indentations 48 and throughbores 50 are oriented to align with the indentations 32 and the internally threaded openings 44, respectively, of the surface 30. However, the indentations 48, while having the same surface dimensions and orientation as the indentations 32 of the surface 30, all have uniform depths. Preferably, the depth of each indentation 48 is the same as the indentation 32b of the surface 30.

The base member 14 also includes a pedestal 52 protruding from a second surface 54 thereof. Preferably, the pedestal 52 is defined by three columns 56 to which the optical element 28 is secured by known means such as an epoxy, or the like.

Figure 3:
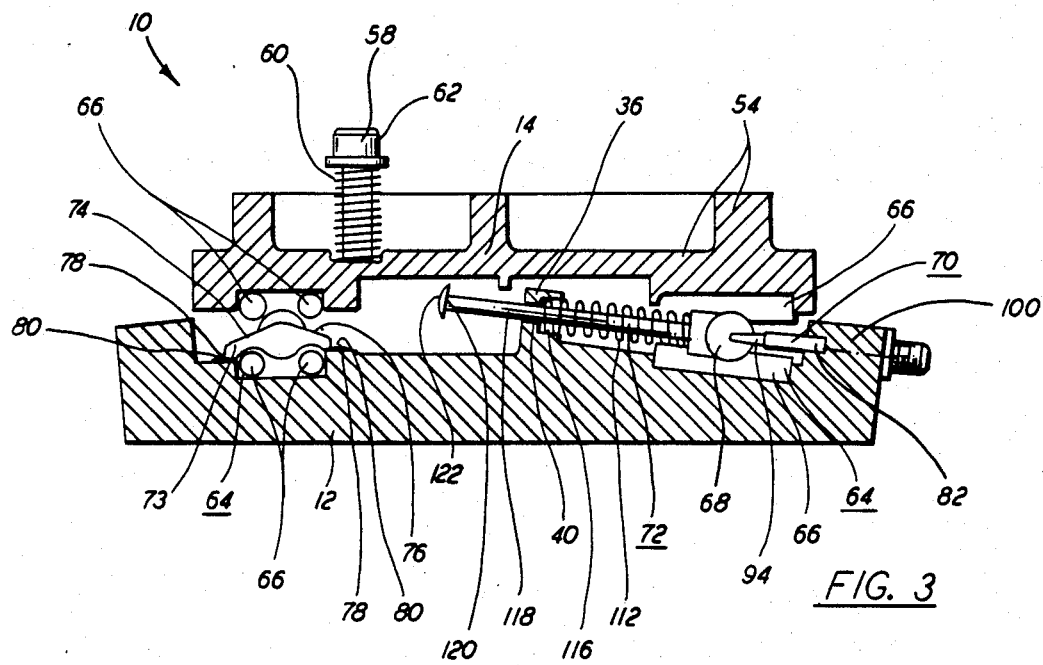
FIG. 3 is a partial cross-sectional view of an assembly of the frame member of FIG. 1 and the base member of FIG. 2.

As shown in FIG. 3, the base member 14 is attached to the frame member 12 via, for example, cap screws 58 having biasing means 60 between the second surface 54 and the caps 62. It is preferred that the throughbores 50 be slightly counterbored to accept the ends of the biasing means 60 therein and thereby prevent lateral sliding thereof. The screws 58 pass through the throughbores 50 and thread into the internally threaded openings 44.

In the preferred embodiment, the means for tilting the base member 14 with respect to the frame member 12 includes a plurality of tracks 64, each track being defined by a plurality of track defining elements 66; a track translation member 68; as means 70 for urging the member 68 along the defined track; and a means 72 for biasing the member 68 against the urging means 70.

In one embodiment, the assembly 10 includes three tracks 64 each being defined by four elements 66. More specifically, each track 64 is defined by two pair of elements 66, one pair being positioned in the indentations 32 in the frame member 12 and the other pair being positioned in the indentations 48 in the base member 14. In this embodiment, the elements 66 are cylindrical rods. The two tracks, 64a and 64c are inclined due to the sloped profile of the bottom of the indentations 32a and 32c, whereas the track 64b is substantially parallel to the surface 30 of the frame member 12. Each track 64 has a track translation member 68 associated therewith.

The track translation members 68 are, in this embodiment, spheres and are positioned between the four track defining elements 66. As more fully discussed below, the members 68 are translatable along the tracks 64a and 64c. The member 68 associated with the track 64b is, however, restrained from movement by a locking clip 73 and, being fixed, serves as a pivot point about which the base member 14 is tilted. Preferably, the locking clip 73 is a bracket having a raise surface 74 having an opening 76 therethrough and a pair of mounting flanges 78. The opening 76 should be such as to allow a portion of the upper hemisphere of the sphere to extend therethrough for contact with the track elements 66 in the indentation 48 of the base member 14. The flanges 78 can be secured to the surface 30 by known means such as, for example, a pair of screws 80. Consequently, when the sphere in the tracks 64a and 64c are translated therealong the base member 14 is tilted in two planes with respect to the frame member 12.

Figure 5:
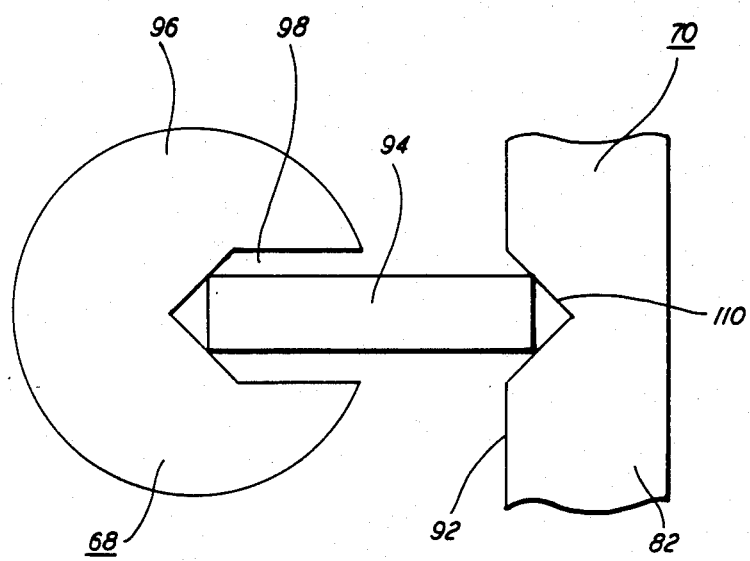
FIG. 5 is a detailed view of a translating member useful in the preferred embodiment of the present invention.

The means 70 for translating each of the unrestrained members 68 along the tracks, 64a and 64c, includes a lever 82. The lever 82 is contacted on one side 83 at each end, 84 and 86, by adjustable urging means, 88 and 90, respectively. On the other side 92, each lever 82 contacts, preferably via an urging pin 94, the respective sphere. One arrangement for providing an urging pin 94 connection to a sphere is shown in FIG. 5. Therein, a sphere 96 is provided with an opening 98 dimension such that the urging pin 94 can be inserted thereinto. In order to provide both coarse and fine adjustments the contact point between the urging pin 94 and the other side 92 of the lever 82 is closer to the one end 84. Thus, for the same movement of the urging means, 88 and 90, the sphere is translated further by the urging means 90 associated with the one end 84 than with the other end 86.

Preferably the adjustable urging means, 88 and 90, are screws threaded through a fixed standoff 100 having internally threaded openings, 102 and 104, respectively.

The standoff 100 is, preferably, formed as an integral part of the frame member 12 and the axes of the internally threaded openings 102 and 104 are coplanar with the track 64. Further, to increase the stability of the translating means 68, the urging pin 94 contacts the lever 82 such that an imaginary line drawn between the contact points of the urging means, 88 and 90, passes through the urging pin 94 between its contact point with the lever 82 and the sphere. Consequently, by providing a pad 106 having an opening 108 at, for example, the other end 86 of the lever 82 and by providing an urging pin 94 receiving notch 110 in the lever 82, the lever 82 can be floatingly mounted. Such an arrangement reduces the possibility of mechanical binding during the tilt adjustment of the base member 14.

In order to provide smooth bidirectional translation of the sphere a biasing force is provided which is directed opposite and colinear to the force exerted thereupon by the urging pin 94. Preferably, this biasing force is provided via a coil spring 112 confined between a sphere contact member 114 and counterbores 116 in the standoffs, 36 and 38. In order to maintain the direction of the biasing force and further confine the coil spring 112 each biasing force arrangement is provided with a rod 118 which passes through the openings, 40 and 42, each coil spring 112 and includes the contact member 114. The end 120 of each rod 118 distal the contact member 114 is provided with a head 122 having a diameter greater than the diameter of the opening, 40 or 42.

In the preferred embodiment described above the frame member 12 and the base member 14 are formed from aluminum and the indentations 32 therein have rectangular surfaces which are 1.5 cm. long by 1 cm. wide. Those indentations 48 in the base member 14 have a uniform depth are on the order of about 0.3 cm. deep. The indentations on the frame member 12 have depths which vary from 0.3 cm. at one end to 0.45 cm. at the distal end. The track defining elements 66 are cylindrical rods having a length of about 2 cm. diameters on the order of about 0.5 cm. and are preferably formed from hardened steel. The spheres 68 have diameters on the order of about 1 cm. and are formed from hardened steel. The urging pin receiving notch 110 is positioned on the lever 82 a distance of 1 cm. from the proximate end thereof. The urging means, 88 and 90, preferably screws having threads of 32 threads per inch.

In such an embodiment the position of the screw can be controlled to a lateral movement accuracy of 0.022 mm. Since, by the above arrangements, the slope of the track 64 is about 6 degrees, the ratio of the total angular adjustment ranges to the smallest adjustment that can be made is about 10,000:1. In general, the nominal increment of adjustment by use of a screwdriver or allen wrench will be taken to be about 10°. Many people can do better and it depends on the size of the screwdriver handle or the length of the allen wrench handle. However, a 10° increment will be considered as a basis for the following. As the threads of the adjusting screws, 88 and 90, are 32 per inch, or 12.6 per centimeter, one thread is 0.079 centimeters and a 10° increment of rotation is about 0.022 millimeters of linear screw movement. Considering a lever ratio of 5:1 the resultant sphere movement is 0.00044 centimeters along the track 64. For a track 64 of 6° slope the resultant movement of the base member 14 with respect to the frame member 12 is about 0.000046 centimeters; i.e. 0.46 micrometers. As the spacing between the moving sphere and the fixed sphere is about 7.6 centimeters the resultant angular adjustment is about 0.000006 radians or 1.2 arc seconds. It should be noted that the base member 14 is free to pivot with respect to the fixed sphere. Such an arrangement ensures that the position of the base member 14 is exactly constrained by six points of contact, two with each ball, regardless of manufacturing tolerances in the construction.

Figure 6:
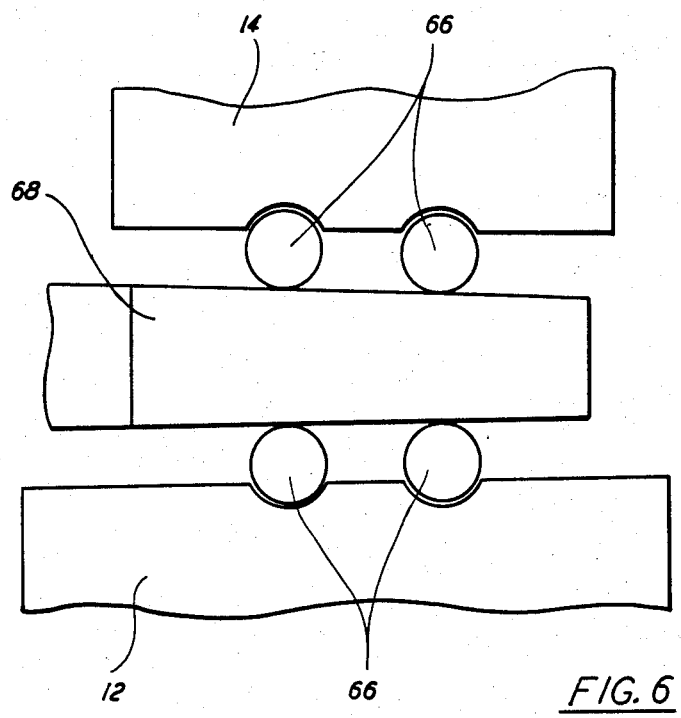
FIG. 6 is a plan view of an alternative track and translating member arrangement.

Referring now to FIG. 6 there is shown therein an alternate embodiment for the translation means. Therein the track defining elements 66 are spheres having a diameter of about 0.5 cm. and the track translation member 68 is a truncated cone having a large diameter on the order of about 0.5 cm., a small diameter of about 0.3 cm. and a perpendicular length on the order of about 1.5 cm. In such an embodiment, the spheres are positioned in indentations in the frame member 12 and base member 14 and the tilting of the base member 14 with respect to the frame member 12 occurs with the lateral movement of the truncated cone, i.e. the varying diameter of the truncated cone causing a change in the spacing between the base member 14 and the frame member 12. Although shown in cross-section it will be understood by those skilled in the art that the base member 14 and the frame member 12 in this embodiment each contain four indentations for the track defining elements i.e. each track includes eight spheres, four being positioned in the base member 14 and four being positioned in the frame member 12. The lever type movement of the truncated cone is substantially identical to that described hereinbefore with regard to the urging of the spheriod member.

Although both embodiments provide accurate adjustment of the angular tilt of the base member 14 with respect to the frame member 12, the advantage of the embodiment having cylindrical track defining elements 66 is the thermal stability thereof. Specifically, at each of the three points of contact, the three ball and groove mounts have an identical cross section with regard to thermal expansion regardless of the position of the sphere. In the second embodiment however, the cross section for thermal expansion is slightly different due to the difference in the diameter of the truncated cone between the sets of track defining elements 66. Consequently, with regard to the first embodiment described, any uniform change in temperature in the system has no effect on the angle of the base member 14 with respect to the frame member 12. This thermal stability permits the use of different materials for the cylinderical rods and the spheres, whereas to achieve maximum thermal stability in the embodiment shown in FIG. 6 it is preferred that the spheres in the cone all be formed from the same material.

The present invention has been described herein with respect to specific exemplary embodiments, it is understood that other arrangements and configurations may be made by those skilled in the art which nevertheless fall within the spirit and scope of the invention as defined by the appended claims and the reasonable interpretation thereof.

What is claimed is:

1. Assembly for positioning an optical element, comprising:
   a frame member;
   a base member, said base member being affixed to and spaced apart from one wall of said frame member, said base member having means for rigidly affixing said optical element thereto;
   means for tilting said base member with respect to said wall of said frame member, said tilting means having a coarse and fine tilt adjustment means associated therewith;
   said tilting means including:
   a pair of tracks, said tracks being defined by two pairs of track forming elements;
   means, associated with each said track, for varying the distance between said pairs of track forming elements;
   said distance varying means including:
   a track translation member; and
   means for urging said track translation member along said track;
   said track forming elements being spheres, and said track translation member being a truncated cone.

2. Assembly for positioning an optical element, comprising:
   a frame member;
   a base member, said base member being affixed to and spaced apart from one wall of said frame member, said base member having means for rigidly affixing said optical element thereto;
   means for tilting said base member with respect to said wall of said frame member, said tilting means having a coarse and fine tilt adjustment means assocated therewith;
   said tilting means including:
   a pair of tracks, said tracks being defined by two pairs of track forming elements;
   means, associated with each said track, for varying the distance between said pairs of track forming elements;
   said distance varying means including:
   a track translation member; and
   means for urging said track translation member along said track;
   each said track including two pairs of rods, one pair being associated with said frame member and the other pair being associated with said base member, said pairs being oblique thereby defining an inclined track; and
   said track translation member being a sphere.

3. Assembly as claimed in claim 2 wherein said uring means includes an urging pin extending into said track translation member at one end thereof and contacting a lever at the other end; and
   means for adjustably urging the ends of said lever.

4. Assembly as claimed in claim 3 wherein said urging pin contacts said lever closer to said one end than said other end.

5. Assembly as claimed in claim 3 further comprising:
   means for providing a biassing force to said track translator member whereby backlash is prevented during translation of said member.

6. Assembly for positioning an optical element, comprising:
   a frame member;
   a base member, said base member being affixed to and spaced apart from one wall of said frame member, said base member having means for rigidly affixing said optical element thereto;
   means for tilting said base member with respect to said wall of said frame member, said tilting means having a coarse and fine tilt adjustment means assocaited therewith;
   said tilting means including:

a pair of tracks, said tracks being defined by two pairs of track forming elements;

means, associated with each said track, for varying the distance between said pairs of track forming elements;

said distance varying means including:

a track translation member; and means for urging said track translation member along said track;

said urging means including an urging pin extending into said track translation member at one end thereof and contacting a lever at the other end; and means for adjustably urging the ends of said lever.

7. Assembly as claimed in claim 6 wherein said urging pin contacts said lever closer to said one end than said other end.

8. Assembly as claimed in claim 6 further comprising:

means for providing a biassing force to said track translator member whereby backlash is prevented during translation of said member.

* * * * *